United States Patent
Saucier et al.

[19]

[11] Patent Number: 5,832,555
[45] Date of Patent: Nov. 10, 1998

[54] COMPACT MOVEABLE RAMP ASSEMBLY

[75] Inventors: Stanton D. Saucier, Tarzana, Calif.; Percy Fretwell, Bury, England; Par E. Dannas, Chatsworth, Calif.

[73] Assignee: Ricon Corporation, Pacoima, Calif.

[21] Appl. No.: 804,816

[22] Filed: Feb. 24, 1997

Related U.S. Application Data

[63] Continuation-in-part of Ser. No. 395,556, Feb. 27, 1995, Pat. No. 5,636,399.
[51] Int. Cl.$^6$ .............................. A61G 3/06; B60P 1/43
[52] U.S. Cl. .......................... 14/71.1; 414/522; 414/921; 414/537
[58] Field of Search .................................. 14/69.5, 71.1, 14/71.3; 280/166; 296/61; 414/522, 537, 921

[56] References Cited

U.S. PATENT DOCUMENTS

| | | |
|---|---|---|
| 4,325,668 | 4/1982 | Julian et al. . |
| 4,339,224 | 7/1982 | Lamb . |
| 4,466,771 | 8/1984 | Thorley et al. . |
| 4,685,857 | 8/1987 | Goeser et al. . |
| 4,685,858 | 8/1987 | Manning et al. ................... 414/522 X |
| 4,759,682 | 7/1988 | Hood . |
| 4,827,548 | 5/1989 | Hood . |
| 4,845,792 | 7/1989 | Bakula et al. . |
| 4,850,788 | 7/1989 | Dickson . |
| 5,160,236 | 11/1992 | Redding et al. . |
| 5,257,894 | 11/1993 | Grant . |
| 5,259,081 | 11/1993 | Henderson . |
| 5,284,414 | 2/1994 | Kempf . |
| 5,299,904 | 4/1994 | Simon et al. . |
| 5,305,486 | 4/1994 | Smith et al. . |
| 5,380,144 | 1/1995 | Smith et al. . |
| 5,391,041 | 2/1995 | Stanbury et al. . |
| 5,393,192 | 2/1995 | Hall et al. . |
| 5,433,580 | 7/1995 | Kempf . |
| 5,636,399 | 6/1997 | Tremblay et al. ....................... 14/71.1 |
| 5,675,515 | 10/1997 | Haustein . |

FOREIGN PATENT DOCUMENTS

| | | |
|---|---|---|
| 374154 | 4/1980 | Austria . |
| 0 217 265 A1 | 9/1986 | European Pat. Off. . |
| 0578574 A1 | 12/1994 | European Pat. Off. . |
| 42 34 064 A1 | 5/1993 | Germany . |
| 2313589 | 3/1997 | United Kingdom . |

OTHER PUBLICATIONS

International Preliminary Examination Report from PCT of parent CIP case; PCT Serial No. PVT/US96/02359.
International Search Report from PCT of parent CIP case; PCT Serial No. PCT/US96/02359.

*Primary Examiner*—James Lisehora
*Attorney, Agent, or Firm*—Darby & Darby, P.C.

[57] ABSTRACT

A compact movable ramp assembly is provided that can be securely stored beneath a vehicle floor and safely and reliably operated. The ramp assembly comprises a mounting structure having a series of top panels that form the vehicle floor. The ramp assembly also includes a moveable platform that deploys outward from the mounting structure forming an extended ramp from the ground level to the vehicle to allow the passage of passengers across the platform into and out of the vehicle. The compact design of the ramp assembly is achieved by enclosing the motor unit within the ramp assembly and positioning the drive mechanism above the moveable platform but below the top panels of the mounting structure. The platform is formed of two portions pivotally connected by a hinge which enables the platform to pivot downward and allows the ramp assembly to be used in partial stages of deployment.

25 Claims, 8 Drawing Sheets

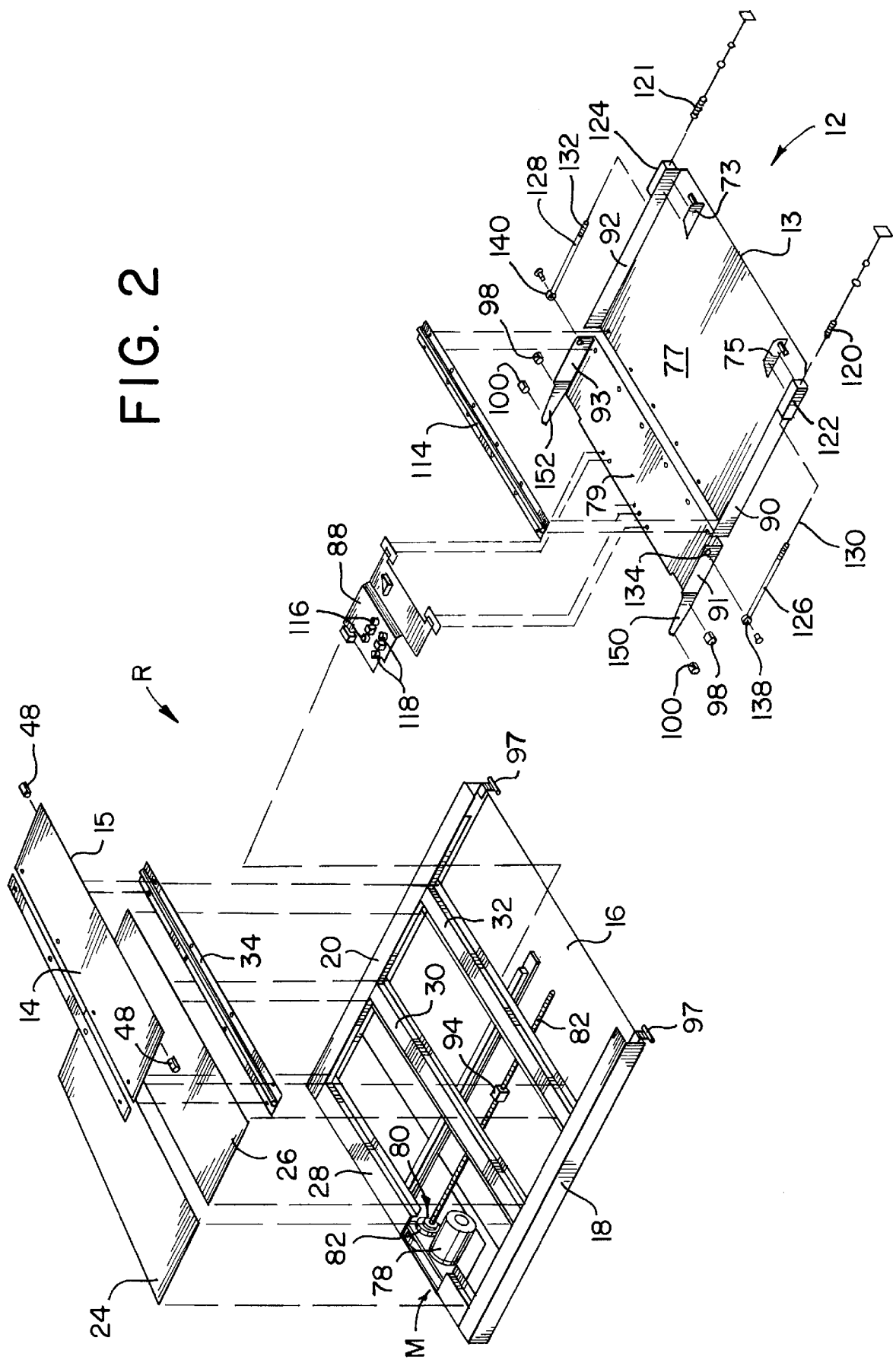

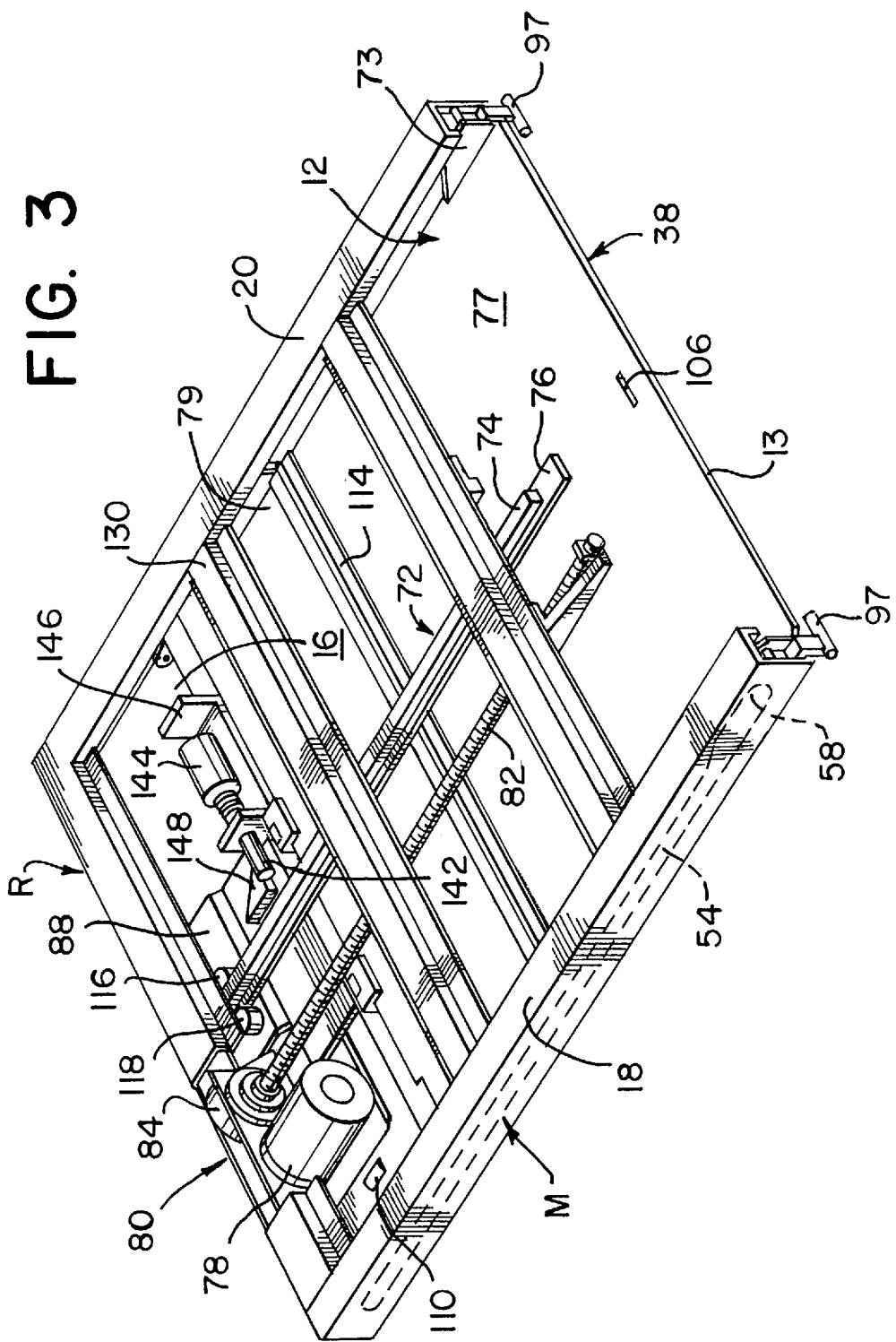

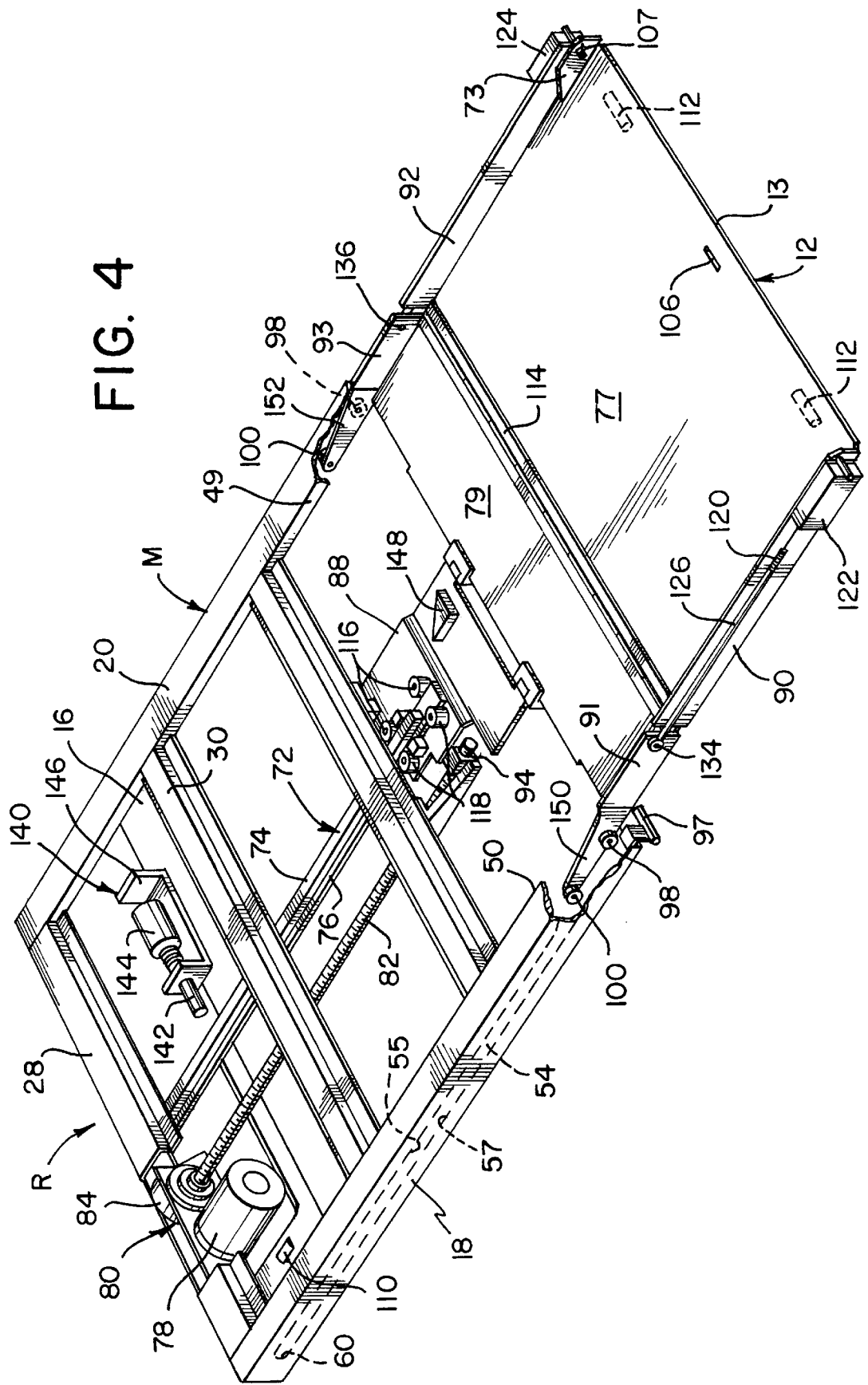

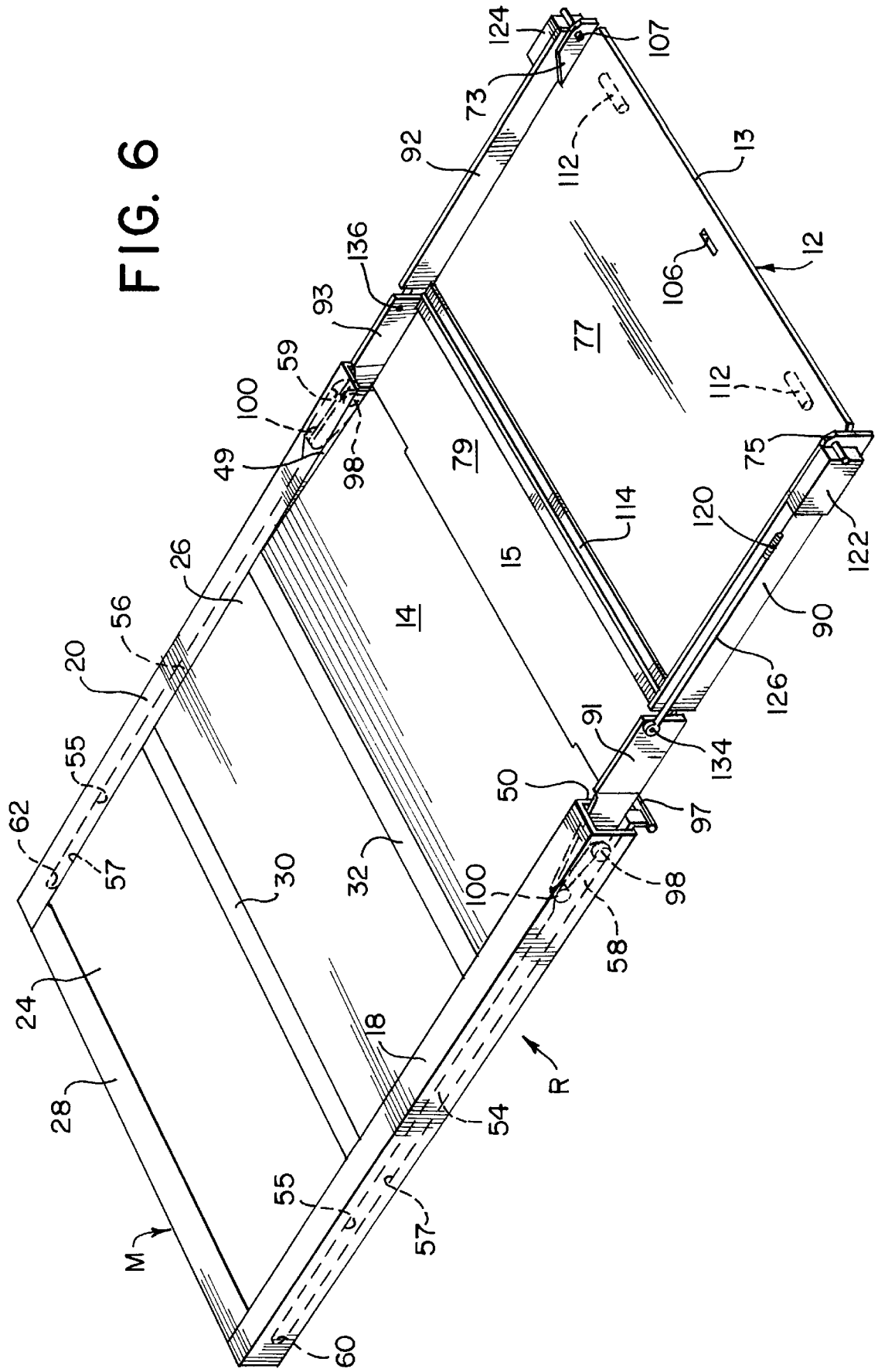

COMPACT MOVEABLE RAMP ASSEMBLY

This is a continuation-in-part of application Ser. No. 08/395,556 filed Feb. 27, 1995 and entitled "An Improved Moveable Ramp Assembly", now U.S. Pat. No. 5,636,399.

FIELD OF THE INVENTION

This invention relates generally to ramps facilitating passengers to board and unload from vehicles, in particular, ramps facilitating access to persons with limited mobility.

BACKGROUND OF THE INVENTION

A growing concern exists for persons who are physically challenged or otherwise have limited mobility. That concern has given rise to the development of devices to accommodate such persons. Such developments have included wheelchair lifts for transporting occupied wheelchairs, and the like, in and out of vehicles. Typically, these lifts provide mobile platforms for raising and lowering passengers from a ground level outside the vehicle to a vehicle floor entry level.

Ramps have also been developed for enabling access into and out of vehicles. As concerning ramps which travel with the vehicles, these ramps are typically stored in the vehicles when not in use and deployed when it is necessary to provide passenger access. When such a ramp is deployed, the two ends of the platform are typically positioned at different heights. One end is usually adjacent the vehicle floor and the other end is usually on the ground. As such, depending on the terrain on which the vehicles are parked, a relative height difference exists between the vehicle floor and the ground, which may be quite substantial.

Since the passengers must travel across from one end of the ramp to the other, it is necessary that the ramp be fully deployable without obstruction by formations in the terrain. Also, when deployed, the ramp must provide a safe surface on which the passengers are supported while they travel across the ramp.

Proposed wheelchair ramps have included a platform which is pivotally connected at a lower edge to the vehicle floor. Such a platform is typically stored in an upright position and is thus deployed by swinging the platform outwardly from the vehicle about the lower edge of the vehicle floor. Accordingly, the platform moves through a substantial range of motion with the upper edge starting from a relatively high position and ending at a relatively low position. With such a substantial range of motion, there exists a danger of undesirable motions or displacements in which the platform may move to undesirable positions, or even free fall through space. As a result, persons nearby may sustain injuries.

As a solution to this problem, wheelchair ramps have been designed to fit beneath the vehicle floor in which the platform translates from below the vehicle floor from a horizontal stored or stowed position to a deployed position where the platform extends beyond the vehicle to the ground surface. Although these ramps may avoid the dangers associated with the other proposed wheelchair ramps and are relatively less complex in design, they are often difficult to operate and do not easily fit below the vehicle floor surface. In addition, where the terrain is particularly uneven and/or the vehicles utilizing the underfloor ramps have low vehicle floors (or low operational floors), the ramps often cannot be fully deployed. For example, where the vehicles are parked curbside, the curb often obstructs the translating platform from reaching their full extension beyond the vehicles. This problem may be avoided by providing ramps with shortened platforms; however, shorter ramps can involve steeper surfaces on which the passengers must either ascend or descend in their wheelchairs. For example, in conventional wheel chair lifts, the platform must be completely extended before the platform can pivot downward to the ground surface. This design often causes inconvenience in that occupiers of wheelchairs must often move back from an area to allow room for deployment of a platform from a vehicle V. In addition, wheelchair ramps that require full deployment of the platform before the platform can reach ground surface often require careful maneuvering of the vehicle if the operator would like to deploy the platform to a specific location. Consequently, there exists a need for a ramp assembly which is relatively simple in design and structure, which can fit beneath the vehicle floor surface and avoids the dangers and difficulties of current vehicle ramps.

SUMMARY OF THE INVENTION

In accordance with the present invention, a compact wheelchair ramp assembly (ramp assembly) is provided that can be securely stored beneath the vehicle floor. In accordance with one embodiment of the invention, the ramp assembly is stored under the vehicle floor (or the operating passenger floor) and comprises a mounting structure having a series of top panels, a bottom panel, and side and cross beams positioned therebetween. The ramp assembly includes a moveable platform that deploys outward from the mounting structure forming an extended wheelchair ramp from ground level to the vehicle to allow passage into and out of the vehicle.

The platform movement is facilitated by a motor unit positioned between the top and bottom panels of the mounting structure and a drive mechanism located above the platform but below the top panels. By containing the motor unit within the mounting structure and positioning the drive mechanism between the platform and top panel, the wheelchair ramp assembly is compact enough so as to easily fit beneath the operating passenger floor of different vehicles. In addition, the ramp assembly is also designed so that it does not require full deployment of the platform to be functional, that is, the platform can be utilized in any stage of partial deployment. The platform has a pivotal connection which allows the free end of the platform to pivot downward if the platform does not reach the ground surface on full deployment. This allows the platform to be utilized for entry into the vehicle by persons occupying wheelchairs regardless of the distance between the vehicle and the curb. In addition, this acts as a safety feature which prevents someone from falling off the platform when inadvertently stepping on the platform. Furthermore, the ramp assembly also includes an interlock mechanism which locks the platform in place while the platform is in the stowed position.

These, as well as other features of the invention, will become apparent from the detailed description which follows, considered together with the appended drawings.

DESCRIPTIONS OF THE DRAWINGS

In the drawings, which constitute a part of this specification, exemplary embodiments demonstrating various features of the invention are set forth as follows:

FIG. 2 is an exploded perspective view of a disclosed embodiment of the present ramp assembly;

FIG. 3 is a perspective view of a disclosed embodiment of the present ramp assembly without top panels with the ramp in the stowed position;

FIG. 4 is a perspective view of the ramp assembly with the ramp in a deployed position;

FIG. 6 is a perspective view of the ramp assembly of FIG. 4 with top panels attached;

DESCRIPTION OF THE ILLUSTRATIVE EMBODIMENTS

As indicated above, detailed illustrative embodiments are disclosed herein. However, structures for accomplishing the objectives of the present invention may be detailed quite differently from the disclosed embodiments. Consequently, specific structural and functional details disclosed herein are merely representative; yet, in that regard, they are deemed to afford the best embodiment for purposes of disclosure and to provide a basis for the claims herein which define the scope of the present invention. In addition, application Ser. No. 08/395,556 filed Feb. 27, 1995 and entitled "An Improved Moveable Ramp Assembly," the issue fee being paid on Jan. 28, 1997, is hereby incorporated by reference.

Figure 1:
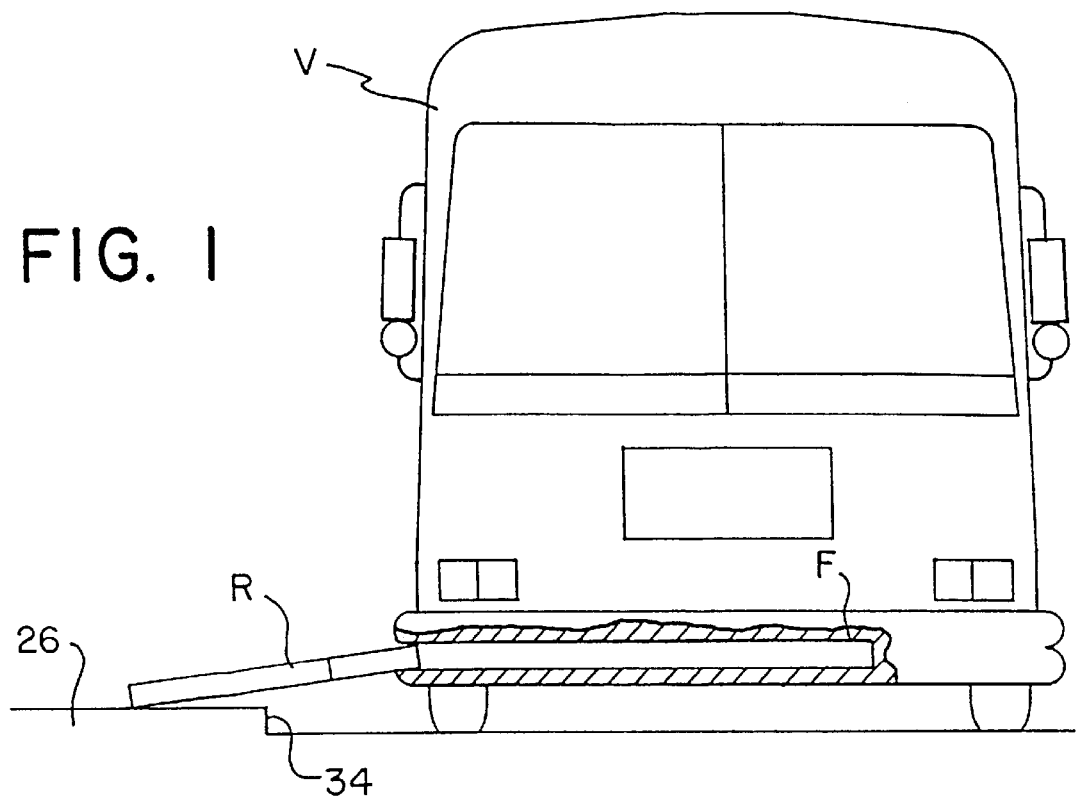
FIG. 1 is a diagrammatic representation of a front view of a vehicle carrying a ramp assembly in accordance with the present invention.

Referring to FIG. 1, a front portion of a vehicle V is shown carrying a wheelchair ramp assembly R fully extended on which a passenger in wheelchair (not shown) may travel from ground level to floor level F in the vehicle V. The vehicle with which the ramp assembly R may be used is not limited to buses and automobiles, as illustrated, but rather may include trailers, trains, etc. or any structure for transporting people. The ramp assembly R may be secured to the rear, side or other appropriate opening of a vehicle. As illustrated in FIG. 1, the ramp assembly R is installed at the floor F of the vehicle V to operate through a side doorway (not shown). As briefly mentioned above, the ramp assembly R may be installed within the vehicle floor such that the passengers are supported directly on top of the ramp assembly R. That is, where the top panels of the ramp assembly R operate as the passenger floor.

Referring to FIG. 2, the ramp assembly R of one preferred embodiment is shown in an exploded view without the vehicle V. Structurally, the ramp assembly R incorporates a platform 12, a mounting structure M having top panels 14, 24 and 26, a bottom panel 16 and side beams 18 and 20 rigidly affixed to bottom panel 16. Extending between the side beams 18 and 20, moving from the rear of the mounting structure M to the front, are cross beams 28, 30 and 32. The cross beams provide for added stability and structural support. Where the ramp assembly R is installed within the mounting structure M, the bottom panel 16 is affixed to the vehicle floor F by screws (not shown), or the like. Accordingly, consistent with the discussion above, the top panels 14, 24 and 26 operate as the passenger floor of the vehicle V in the disclosed embodiment. However, in an alternative embodiment, top panels 24 and 26 may be substituted by a larger single panel adjacent and coplanar with top panel 14 when the ramp assembly R is in the stowed position.

Referring to FIGS. 3 and 4, FIG. 3 shows the ramp assembly R with the platform 12 in a stowed position with the top panels 14, 24 and 26 removed while FIG. 4 shows the ramp assembly R with the platform in a deployed position also with top panels 14, 24 and 26 removed.

Platform 12 is movable relative to the mounting structure M. In particular, the platform 12 is movable between the top panels 14, 24 and 26 and the bottom panel 16 such that the platform 12 is stored between the top and bottom panels while it is in a stowed or stored position. When deployed, the platform 12 substantially extends beyond the outer edge 38 (See FIG. 3) of the ramp assembly R and projects from between the top and bottom panels 14 and 16 (see FIGS. 5A–5D).

The top panels 14, 24 and 26 of the mounting structure M are substantially planar and horizontal so as to function as the passenger floor. As shown in FIG. 2, top panel 14 is pivotally connected to cross beam 32 by hinge 34 which allows top panel 14 to pivot up and down as the platform 12 moves through the mounting structure M. This can also be seen in FIGS. 5A–5D. When the ramp is deployed, top panel 14 inclines downward toward the platform 12 to serve as an extension of platform 12 to allow easy transition of a wheelchair from platform 12 to floor F of the vehicle, which in this case is comprised of top panels 24 and 26 (see FIG. 6). The outer edge 15 of top panel 14 is tapered downward to provide for a smooth transition from the platform 12 to the top panels 24 and 26.

FIG. 6 shows the ramp assembly R with the platform 12 fully deployed with top panels 14, 24 and 26 attached. Cam guides 54 and 56 are shown in phantom inside side beams 18 and 20 respectively.

Figure 5A:
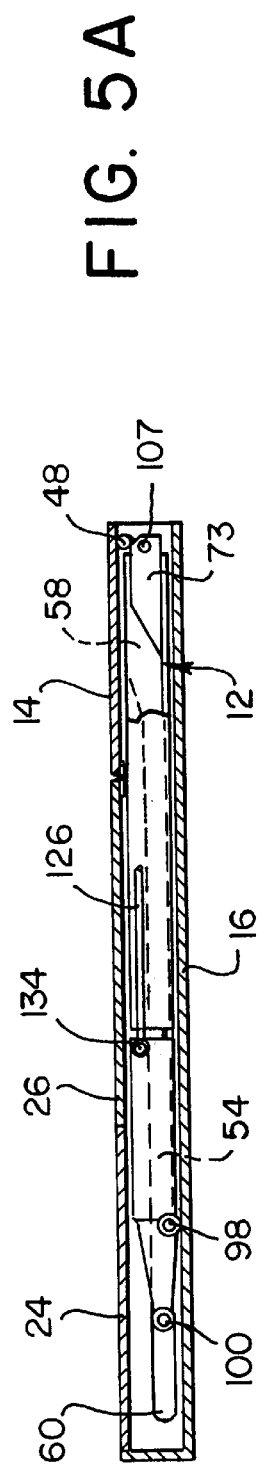
FIGS. 5A–5D are diagrammatical representations of side elevation views of the disclosed embodiment of the present ramp assembly in various stages of deployment.
Figure 5B:
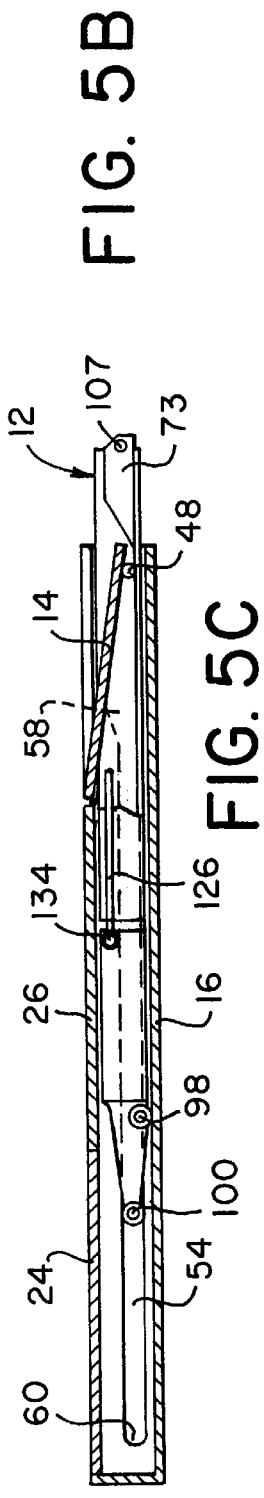

To facilitate the outward movement of platform 12 through the mounting structure M, a pair of rollers 48, or other similar friction-reducing structures, may be affixed to the underside of top panel 14. As platform 12 is deployed, rollers 48 roll over the planar surface of platform 12 which prevents needless friction between the underside of panel 14 and platform 12 (see FIGS. 5A–5D). When platform 12 is in the stowed position, as shown in FIG. 5A, rollers 48 are positioned above platform 12 in an elevated position. The pair of rollers 48 are relatively small so that the outer edge 15 of top panel 14 pivots relatively close to platform 12 leaving little or no gap between outer edge 15 of top panel 14 and platform 12. This design significantly maximizes the actual usage of the ramp assembly R.

While in the stowed position, rollers 48 are guided by a related pair of cams 73 and 75 located at projected end 13 against side edges 90 and 92. Cams 73 and 75 act to pivot rollers 48 and top panel 14 to the horizontal position coplanar with the vehicle floor.

As illustrated in FIGS. 3 and 4, ramp assembly R has an interlock mechanism 140 which locks platform 12 inside the mounting structure M when the platform 12 is in the stowed position. Interlock mechanism 140 comprises a spring loaded pivoting pin 142 which is activated by solenoid 144. Both solenoid 144 and pin 142 are affixed to bracket 146 which is secured to bottom panel 16. The triangular stop 148 is fixed relative to platform 12. While in the stowed position (see FIG. 3), pin 142 abuts triangular stop 148 and prevents platform 12 from deploying. When the operator of the vehicle V activates a remote switch to deploy platform 12, solenoid 144 withdraws pin 142 thereby releasing triangular stop 148 and allowing platform 12 to deploy. When platform 12 moves from the deployed to the stowed position, pin 142 is pushed inward by the hypotenuse side of triangular stop 148 as the platform moves to the stowed position. Once the pin 142 passes the hypotenuse side of triangular stop 148, pin 142 releases, thereby locking platform 12 into place. In the event that power to the vehicle V is lost, there is a manual release handle (not shown) which enables the release of interlock mechanism 140 to allow the platform 12 to deploy. In addition, the triangular stop 148 may be ultimately formed as a cam block or a rotary latch or the like to serve the same function.

As shown in FIG. 6, positioned below and extending the length of the lateral edges of the top panels 14, 24, 26 are side beams 18 and 20. The side beams 18 and 20 have inwardly facing surfaces 49 and 50 with channels defining cam guides 54 and 56. The cam guides 54 and 56 substantially extend the length of the side beams, ending at abutments 58 and 59 adjacent top panel 14 and ending at abutments 60 and 62 below top panel 24. The cam guides 54 and 56 guide the platform 12 as it moves between the stowed and the deployed positions. This will be explained later in greater detail.

As shown in FIGS. 5A–5D, the bottom panel 16 is positioned below the side beams 18 and 20 and is substantially aligned with the top panels 14, 24 and 26. In the disclosed embodiment, the bottom panel 16 is securely affixed to the side beams 18 and 20 by welding, screws (not shown) or the like. As shown in FIG. 3, a rail alignment 72 is provided extending the length of the ramp assembly R. The rail alignment 72 is substantially centrally aligned between the side beams 18 and 20 and is fastened to the underneath surfaces of crossbeams 28, 30 and 32. The rail alignment 72 has an inverted T-shaped cross section with an upper track portion 74 supported on a base 76. Rail alignment 72 is coupled to the platform 12 such that it substantially aligns the platform 12 to the mounting structure M as the platform 12 moves between the stowed position and the deployed position.

Referring back to FIG. 2, the platform 12 is divided between a fixed portion 79 and a pivotal portion 77. The fixed portion ' 79 side edges 91 and 93 and pivotal portion' 77 side edges 90 and 92 are turned upwardly as a safety feature to prevent passengers in wheelchairs from falling off the platform 12. Fixed portion' side edges 91 and 93 are tapered rearward of the platform 12 to form a pair of bracket arms 150 and 152 extending slightly beyond the fixed portion of the platform 12. The bracket arms 150 and 152 are each equipped with a pair of outwardly-facing cam followers 98 and 100. The cam followers 98 and 100 have dimensions enabling them to be received in the cam guides 54 and 56 of the side beams 18 and 20.

As shown in FIGS. 4 and 6, when platform 12 moves through the mounting structure M from a stowed position to a deployed position, the cam followers 98 and 100 rotate along cam guides 54 and 56 facilitating the horizontal movement of platform 12. The cam guides 54 and 56 provide an upper track surface 55 and a lower track surface 57 defining a distance, for example, a height H, which is constant along most of the length of the cam guides 54 and 56. However, at abutments 58 and 59, the height H between upper track 55 and lower track 57 increases which in turn causes cam follower 100 to track the upper track 55 and cam follower 98 to track the lower track 57 (see FIG. 5D) thereby causing bracket arms 150 and 152 and platform 12 to pivot downward toward the ground upon deployment. Thus, cam guides 54 and 56, at abutments 58 and 59, create a motion pattern for platform 12 which causes it to descend to the ground level upon deployment. This motion pattern is repeated in reverse when the platform moves from a deployed position to a stowed position.

The compact design of the ramp assembly R is due to the fact that the motor unit 78 and drive mechanism 80 are contained within the mounting structure M between the bottom panel 16 and the top panels 14, 24 and 26. The motor unit 78 is positioned adjacent cross beam 28. Drive mechanism 80, in one embodiment, comprises ball screw 82 which is horizontally disposed and runs parallel to side beams 18 and 20. Belt 84 connects motor unit 78 to a pulley which in turn causes the ball screw 82 to rotate when the motor unit 78 is activated. Locating the drive mechanism 80 above the platform 12 and below the top panels 14, 24 and 26, as opposed to locating the drive mechanism below the platform 12 as with most ramp designs, provides a more compact ramp assembly R and enables the ramp assembly R to be stored beneath a vehicle floor.

Coupled to the rear surface of platform 12 is alignment plate 88 with a first and second pair of alignment wheels 116 and 118 extending from the alignment plate 88. Positioned to the side of alignment wheels 116 and 118 is a block-alignment guide 94 which is fastened to the alignment plate 88. Block-alignment guide 94 is adapted to receive ball screw 82, as shown in FIG. 4. Ball screw 82 rotates through block alignment guide 94 thereby facilitating movement of platform 12 through the mounting structure M. Thus, the horizontal movement of platform 12 is actuated by motor unit 78 which in turn rotates ball screw 82 thereby moving platform 12 through mounting structure M. Once fully deployed, platform 12 can be retracted from a deployed position to a stowed position by reversing the direction of motor unit 78.

The motor unit 78 can be operated from a remote switch located near the operator of the vehicle or by the operator using a remote control device. This provides the operator of the vehicle the ability to operate the ramp assembly R from a remote location. In addition, the drive mechanism 80 is not limited to the ball screw design coupled to a motor unit but may include a chain and sprocket mechanism, hydraulics or any other means for facilitating movement of the platform 12.

In addition to the ramp assembly R being motor driven, the ramp assembly R may be manually operated. If, for example, the vehicle V loses power, the ramp assembly R may still be utilized. For manual operation, as shown in FIGS. 7A–7C and 8, the ramp assembly R has a pivoting door enclosure 96 which is pivotally connected to the mounting structure M by hinges 97. The pivoting door enclosure 96 is spring activated by spring mechanism 101 which maintains pivoting door enclosure 96 in the closed position. When pivoting door enclosure 96 is in the enclosed position, hook 103 is coupled to nodule 107 which additionally secures pivoting door enclosure 96.

Figure 7A:
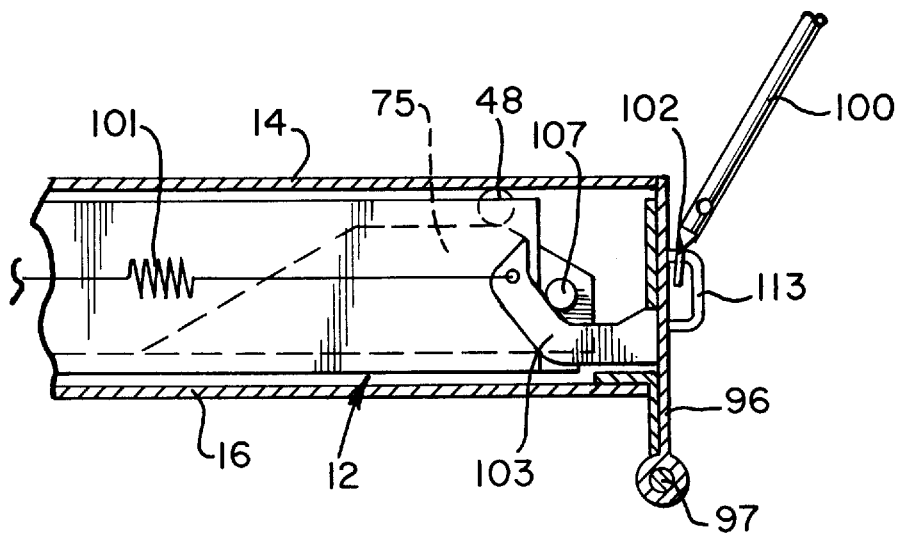
FIGS. 7A–7C are side views of the pivoting door enclosure opened with a manual release bar.
Figure 7B:
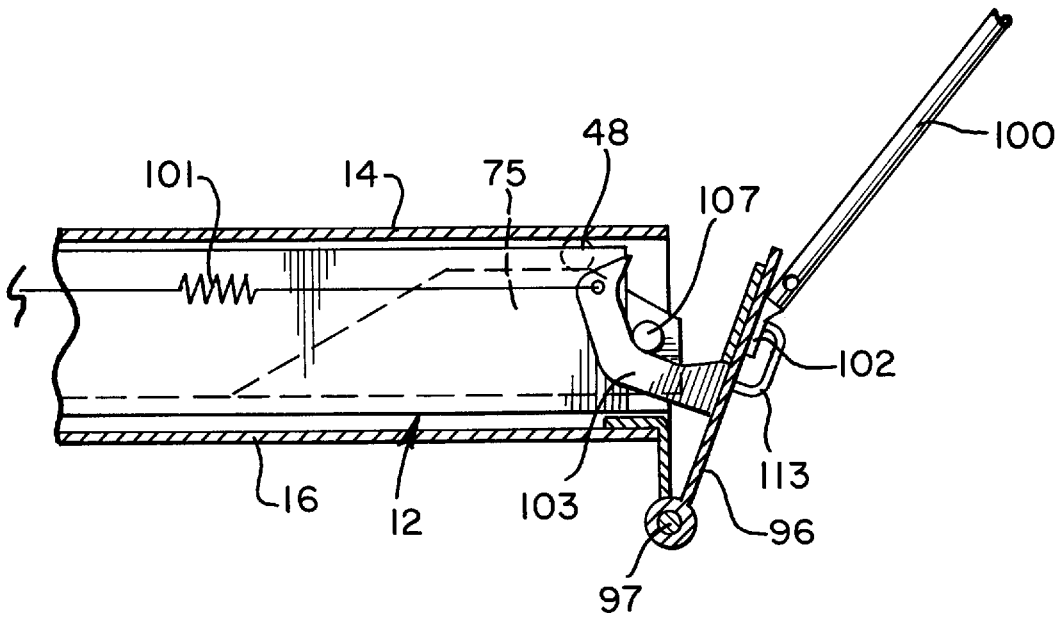
Figure 7C:
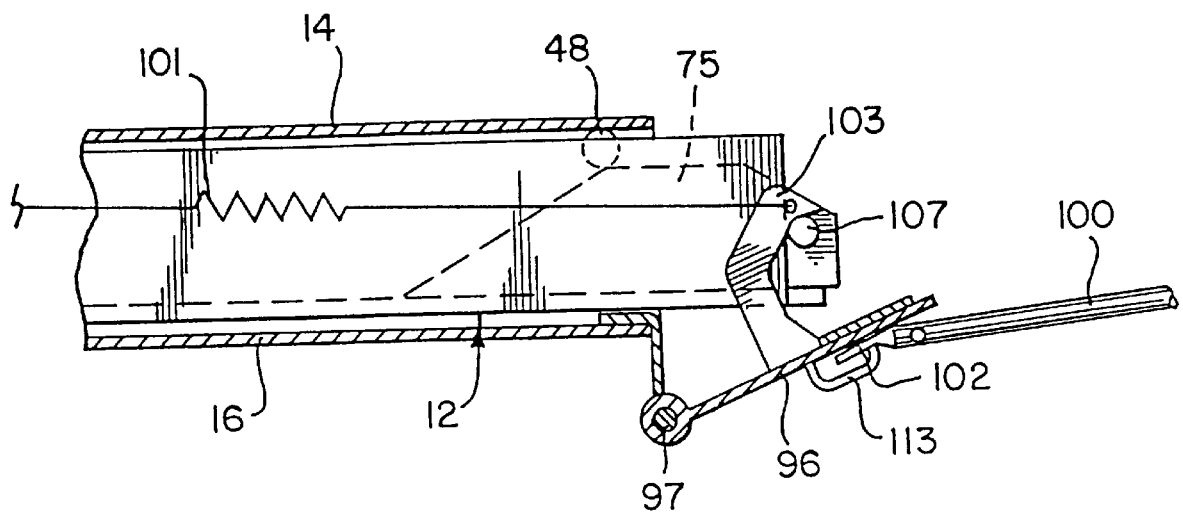

As shown in FIGS. 7A–7C, the pivoting door enclosure 96 has on its outer surface a clip 113 for receiving the tapered end 102 of manual release bar 100. By inserting the tapered end 102 of manual release bar 100 into clip 113 and applying downward force, the pivoting door enclosure 96 may be opened (see FIGS. 7A–7C).

Figure 8:
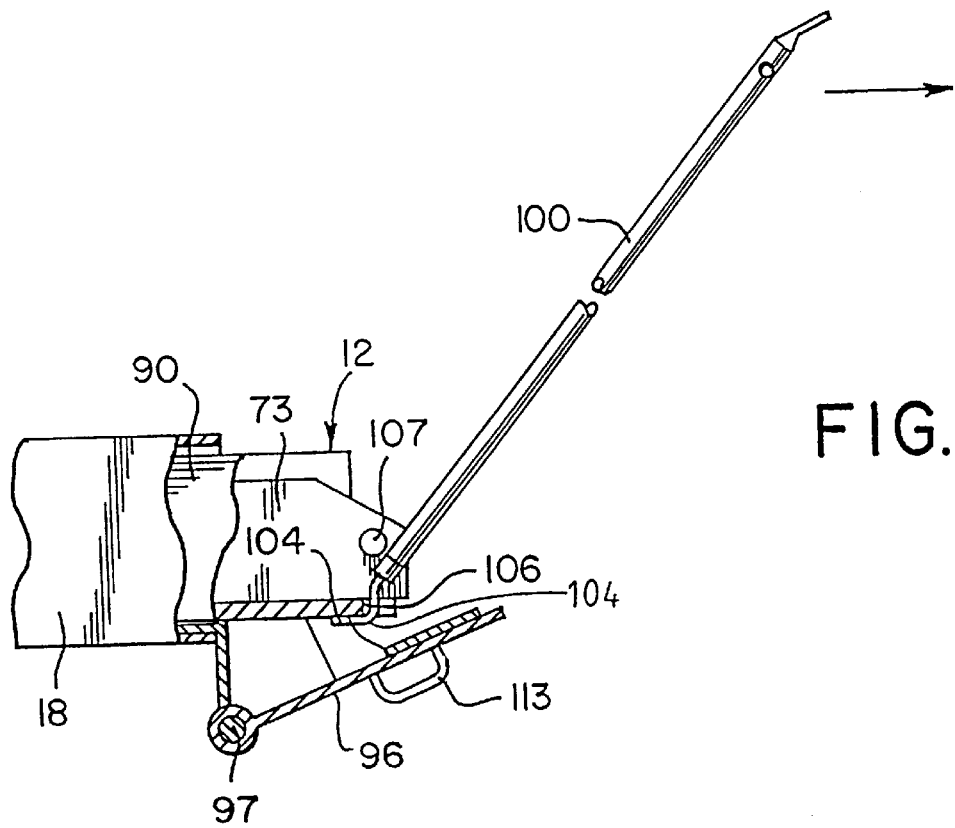
FIG. 8 is a side view of the platform being manually removed from the ramp assembly; and, FIG. 9 is a diagrammatic representation of a front view of a vehicle with the platform pivoting downward due to force being exerted on the platform.

Pivotal portion 77 of platform 12 has a slot 106 defined in its outer edge 13 for receiving the curved end 104 of the manual release bar 100. By inserting the manual release bar 100 in slot 106 and rotating the manual release bar 100 counter clockwise as shown in FIG. 8., the manual release bar securely locks into slot 106. By pulling the manual release bar 100 outward from the ramp assembly R, the platform 12 may be deployed (see FIG. 8). Likewise, for manually storing the platform 12, these steps are performed in reverse order.

Figure 5C:
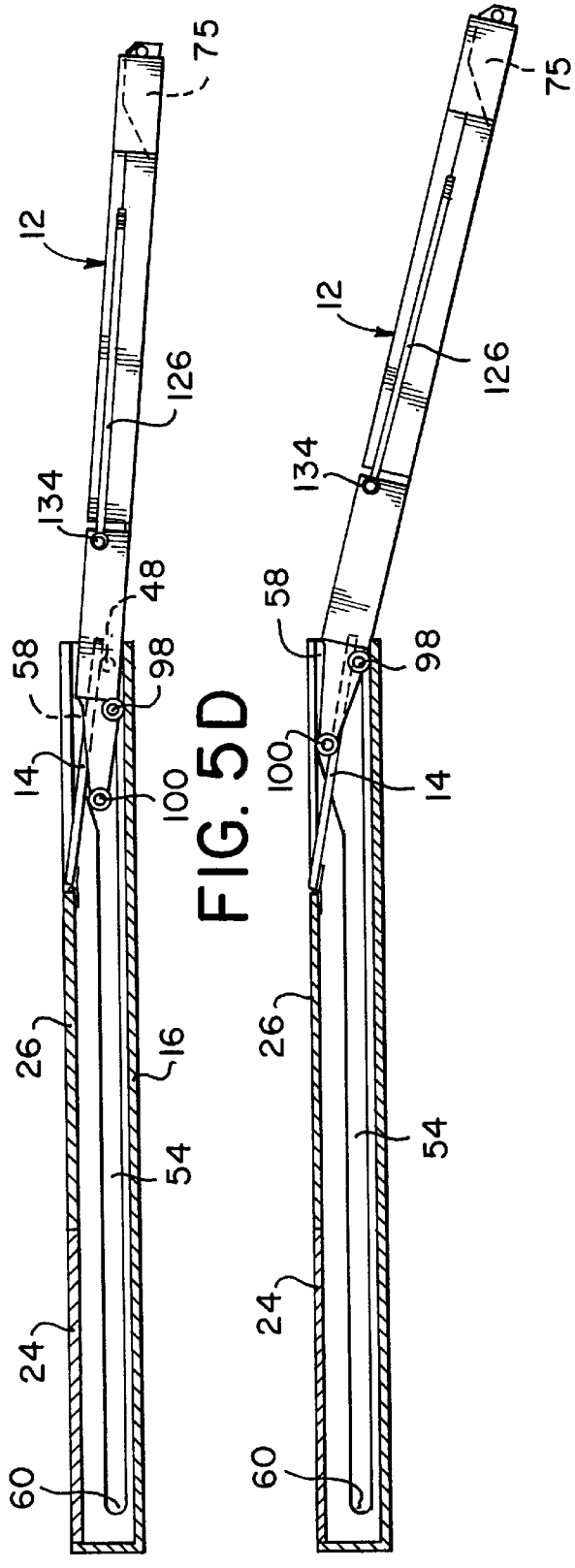
Figure 5D:
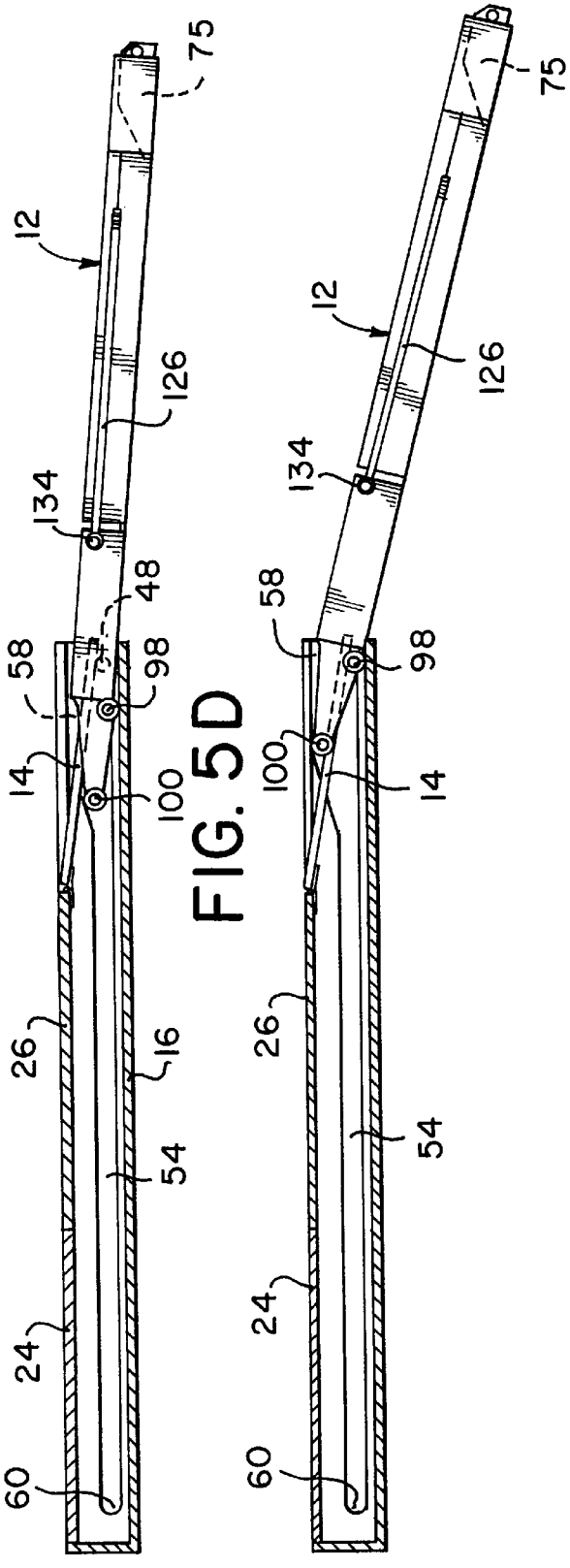

Referring to FIGS. 5A–5D, platform 12 is shown in the stowed position (FIG. 5A), in partially deployed positions (FIGS. 5B–5C) and in the fully deployed position (FIG. 5D). In the stowed position (FIG. 5A), platform 12 is positioned substantially between the top panels 14, 24 and 26 and the bottom panel 16. In the deployed position, the platform 12 extends substantially beyond the outer edge 38 (see FIG. 3) of the mounting structure M. In accordance with the present invention, the platform 12 is deployed through a motion pattern which is substantially straight out (FIGS. 5A–5B) followed by a downwardly inclined motion (FIGS. 5C–5D). Accordingly, as the cam followers 98 and 100 travel through the cam guides 54 and 56, the platform 12 substantially translates horizontally across and through the mounting structure M.

While the platform 12 is in the stowed position, top panel 14 is supported by the platform 12 in a substantially horizontal position. Thus, when the platform 12 is in the stowed position, the top panel 14 is substantially even with the top panels 24 and 26, functioning as a part of the passenger floor. When platform 12 is fully deployed, the ramp assembly R provides an extended surface on which the passengers may travel from the sidewalk or ground surface to inside the vehicle or vice versa. The extended surface is a combination of the platform 12 and the top panel 14 which is also positioned in a downwardly incline, bridging any gap between top panel 14 and the platform 12. Equipped with the hinged platform 12, the vehicle V can safely and reliably load and unload passengers in wheelchairs from the vehicle V to a sidewalk 26 (see FIG. 1). In addition, the ramp assembly R does not require full deployment for operation. The ramp assembly R is operational for use by wheelchairs when the platform 12 is either partially or fully deployed. In addition, because the ramp assembly R is operational when the platform 12 is either partially or fully deployed, the vehicle V can be close to or far from the curb wall 34 when deploying platform 12. This allows the operator of the vehicle V greater flexibility in positioning the vehicle adjacent to the curb wall 34 (see FIG. 1).

Figure 9:
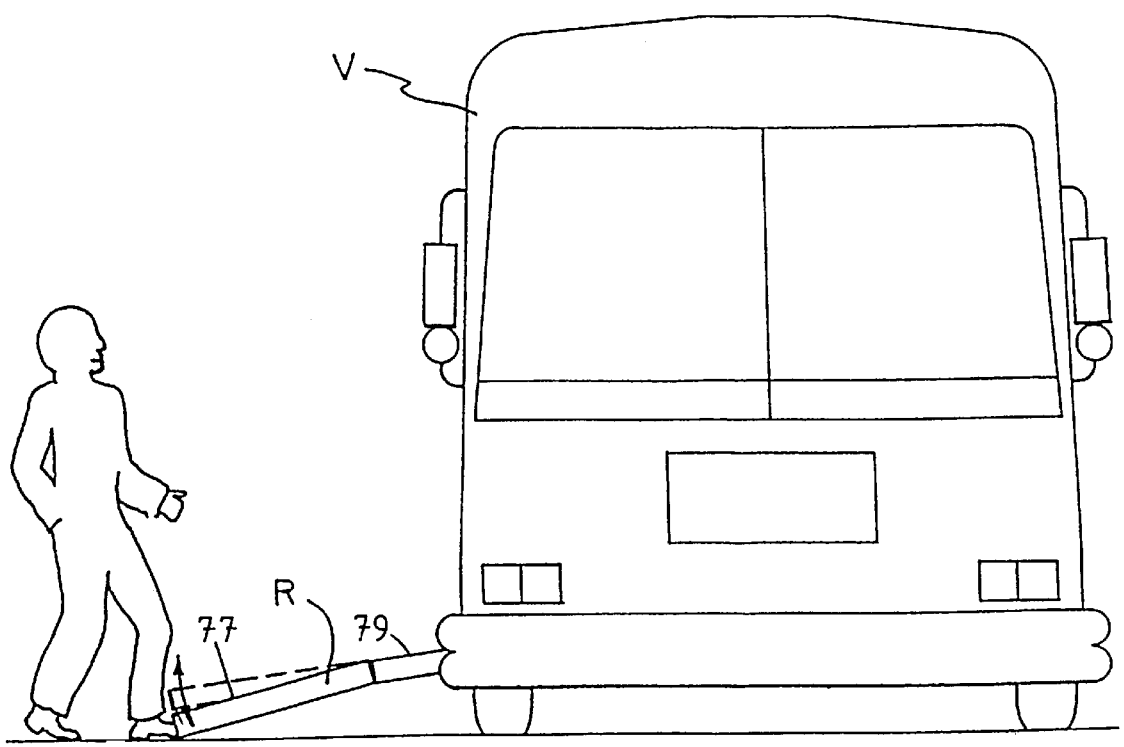

As stated previously, the platform 12 is divided into a fixed portion 79 and a pivotal portion 77. The two portions are connected by a hinge 114 which pivotally connects the fixed portion 79 and the pivotal portion 77. As shown in FIG. 2, hinge 114 runs the entire width of the connected platform 12. Adjacent the outer upturned edges 90 and 92 on the free end 13 of platform 12, a pair of compression springs 120 and 121 are coupled to housings 122 and 124, which are affixed to the outer upturned edges 90 and 92 respectively, of platform 12. The compression springs 120 and 121 are linearly coupled to a pair of strap bolts 126 and 128 which run adjacent and parallel to upturned edges 90 and 92. The strap bolts 126 and 128 are attached at their first ends 130 and 132 to compression springs 120 and 121. Strap bolts 126 and 128 are pivotally attached at their second ends 138 and 140 to fixed portion 79 of platform 12 at pivot points 134 and 136 located in the upturned side edges 90 and 92 of fixed portion 79 of platform 12. The pivot points 134 and 136 are comprised of a bolt shoulder with circular openings for receiving a bolt (not shown). This spring arrangement keeps pivotal portion 77 of platform 12 coplanar with fixed portion 79 of platform 12 when the platform is deployed. However, as shown in FIG. 9, if a downward force is applied to pivotal portion 77 of platform 12, the pivotal portion 77 pivots downward to the ground surface. When the downward force is removed, the pivotal portion 77 will return to coplanar alignment with fixed portion 79 due to compression springs 120 and 121, which constantly exert an upward force on pivotal portion 77 of platform 12.

This arrangement allows for greater flexibility in deploying platform 12. As mentioned, the hinged platform 12 enables the ramp assembly R to accommodate most terrain, especially that of a curbside where the sidewalk is relatively high compared to an adjacent gutter. Where a vehicle utilizing the ramp assembly R to enable passengers in wheelchairs to board and exit the vehicle, the ramp assembly R is safely and reliably deployed over the curb to rest atop the sidewalk without hitting the curb wall 34. For example, the ramp assembly R is well suited for a vehicle suspended low to the ground and/or having a low vehicle floor.

As an added safety feature, a sensor 110 (see FIGS. 3 and 4) is located between crossbeams 28 and 30 adjacent side beam 18 for sensing the presence of platform 12 while in the stowed position. The sensor 110 can be operatively connected to a warning light located near the operator of the vehicle V to indicate to the vehicle V operator when the platform 12 deployed. This would indicate to the vehicle V operator that the platform 12 is deployed to prevent the operator from driving the vehicle while the platform 12 is still in the deployed position. In the alternative, the sensor could be connected to a main power circuit of the vehicle V, sending a control signal to the main power circuit when the platform 12 is in the fully stowed position allowing the main power circuit to be turned on or off. It can also indicate a control signal to disable the main power circuit when the platform is in the deployed position thereby preventing the vehicle V operator from driving the vehicle if the platform 12 is in the deployed position.

In addition, sensors 112 may be installed at the free end of the platform 12 for sensing objects, such as people, which may obstruct the movement of the platform 12, or be injured by the platform 12 (see FIGS. 4 and 6). Both sensors 110 and 112 may be a contact, magnetic or visual sensor or another type of sensor which can detect such objects.

It may be seen that the system of the present invention may be readily incorporated in various embodiments to provide an improved ramp assembly. The various components and dimensions disclosed herein are merely exemplary, and of course, various alternative techniques may be employed departing from those disclosed and suggested herein. For example, the cam guides and the cam followers may be replaced by other structures, such as kinematic structures, for moving the platform relative to the mounting structure. Also, other driving members may be employed to motorize the present ramp. Consequently, it is to be understood that the scope hereof should be determined in accordance with the claims as set forth below.

What is claimed is:

1. A ramp assembly for use with a vehicle, comprising:
    a mounting structure comprising at least one top panel and side sections;
    a platform moveable relative to said mounting structure in a substantially linear direction between a stowed position and a deployed position;
    said platform is comprised of a fixed portion and a pivotal portion with a spring mechanism coupled between said fixed portion and pivotal portion to maintain said portions in coplanar alignment;
    a drive mechanism wherein said drive mechanism is located within said mounting structure between said platform and said at least one top panel.

2. The ramp assembly of claim 1 wherein said side sections are configured to provide cam guides and said platform comprises moving elements for engaging said cam guides when said platform moves between a stowed position and a deployed position.

3. The ramp assembly according to claim 2 wherein said cam guides are formed as channels within said side sections extending substantially along the length of the side sections, each of the channels defining an upper and lower track surface with a varying height therebetween and having an end portion configured to enable said platform to be downwardly inclined toward said deployed position under a force of gravity.

4. The ramp assembly of claim 1 wherein said pivotal portion of said platform is hingedly connected to said fixed portion and said pivotal portion pivots about a hinge.

5. The ramp assembly of claim 1 wherein said platform may be either manually deployed or deployed by said drive mechanism.

6. The ramp assembly of claim 1 wherein the pivotal portion of said platform pivots downwardly to the ground for use as a platform in partial or full deployment upon application of a downward force to the pivotal portion.

7. The ramp assembly of claim 1 wherein the drive means comprises a motor unit and a ball screw wherein said ball screw is positioned between said platform and said at least one top panel and runs parallel to said side sections.

8. The ramp assembly of claim 2 wherein a sensor unit is located within said mounting structure to sense the platform while the platform is in the stowed position.

9. A ramp assembly for use with a vehicle, comprising:
a mounting structure comprising side sections;
a platform moveable relative to said mounting structure between a stowed position and a deployed position;
a drive mechanism wherein said drive mechanism is located within said mounting structure above said platform; and
said platform having an alignment bracket affixed thereto for maintaining alignment of said platform to said mounting structure when said platform moves from the stowed position to the deployed position.

10. The ramp assembly of claim 9 wherein an interlock mechanism releasably interlocks said platform in the mounting structure while the platform is in the stowed position and said interlock mechanism may be activated either manually or by a power control.

11. The ramp assembly of claim 9 wherein the drive mechanism comprises a motor unit and a ball screw wherein the ball screw is positioned above said platform and runs parallel to said side sections.

12. The ramp assembly of claim 9 wherein said mounting structure has at least one top panel and said platform may be either manually deployed or deployed by said drive mechanism.

13. The ramp assembly of claim 9 wherein said alignment bracket has alignment wheels to facilitate movement of the platform as it moves between the stowed and the deployed positions.

14. A ramp assembly for use with a vehicle comprising;
a mounting structure with a platform located therein wherein said platform is moveable along a substantially linear direction between a stowed position and a deployed position;
said mounting structure having side sections and at least a first and second top panel wherein said second top panel is pivotal between a first and second position wherein in said first position said second top panel is coplanar with said first top panel and in said second position said second top panel is pivoted downward toward said platform while the platform is either partially or fully deployed;
said mounting structure having a pivoting door enclosure pivotally mounted on said mounting structure and said pivoting door enclosure moves from an open position to a closed position; and,
a drive mechanism wherein said drive mechanism is located between said platform and said top panels.

15. The ramp assembly of claim 14 wherein said mounting structure has side sections formed therein wherein said side sections are configured to provide cam guides and said cam guides are formed as channels within said side sections extending substantially along the length of the side sections, each of the side sections defining an upper track surface and a lower track surface.

16. The ramp assembly of claim 14 wherein said platform has moving elements for engaging said cam guides.

17. The ramp assembly of claim 14 wherein said platform may be either manually deployed or deployed by said drive mechanism.

18. The ramp assembly of claim 14 wherein said pivoting door enclosure is coupled to said mounting structure by a spring mechanism to maintain said pivoting door enclosure in the closed position.

19. The ramp assembly of claim 18 wherein said pivoting door enclosure opens upon deployment of the platform from the mounting structure.

20. The ramp assembly of claim 14 wherein when said ramp is in the stowed position, the second top panel is locked in the first position.

21. A ramp assembly for use with a vehicle comprising:
a mounting structure comprising at least a first and second top panel and side sections;
a platform moveable relative to said mounting structure in a substantially linear direction between a stowed position and a deployed position;
a drive mechanism comprising a screw mechanism for moving said platform wherein said drive mechanism is located within said mounting structure between said platform and said top panels; and
an interlock mechanism to releasably lock said platform in the mounting structure while said platform is in the stowed position.

22. The ramp assembly of claim 21 wherein said second top panel is pivotal between a first and second position wherein in said first position said second top panel is coplanar with said first top panel and in said second position said second top panel is pivoted downward toward said platform thereby forming an extended platform when said platform is partially or fully deployed.

23. The ramp assembly of claim 21 wherein said platform has moving elements mounted thereon and said platform may be either manually deployed or deployed by said drive mechanism.

24. The ramp assembly of claim 21 wherein said platform has an alignment structure affixed thereto for maintaining alignment of said platform to said mounting structure when said platform moves between the stowed position and the deployed position.

25. The ramp assembly of claim 21 wherein said interlock mechanism is comprised of a spring loaded pivoting pin wherein the interlock mechanism releases said pin to engage said platform thereby locking said platform in the mounting structure while the platform is in the stowed position.

* * * * *